United States Patent [19]
Taylor et al.

[11] Patent Number: 4,875,398
[45] Date of Patent: Oct. 24, 1989

[54] RETRACTABLE DUST CONTROL HOOD AND GUARD FOR ROTARY TABLE SAW

[75] Inventors: James M. Taylor, Plano; Gary M. Karner, Allen, both of Tex.

[73] Assignee: Atlantic Richfield Company, Los Angeles, Calif.

[21] Appl. No.: 144,349

[22] Filed: Jan. 15, 1988

[51] Int. Cl.$^4$ .......................... B27G 19/02; B27B 5/22
[52] U.S. Cl. ........................................ 83/100; 83/397; 83/477.2; 83/478; 83/520; 83/860; 83/DIG. 1; 144/252 R
[58] Field of Search ................ 83/477.2, 478, DIG. 1, 83/860, 57, 58, 68, 100, 397, 520, 521; 144/251 R, 252 R

[56] References Cited

U.S. PATENT DOCUMENTS

| | | | |
|---|---|---|---|
| 1,311,508 | 7/1919 | Harrold | 83/860 |
| 2,496,613 | 2/1950 | Woodward | 83/478 |
| 4,033,218 | 7/1977 | Donatelle | 83/478 |
| 4,257,297 | 3/1981 | Nidbella | 83/520 |
| 4,517,869 | 5/1985 | Kuhlmann et al. | 83/477.2 |
| 4,576,072 | 3/1986 | Terpstra et al. | 83/478 |

FOREIGN PATENT DOCUMENTS 3340579  5/1985  Fed. Rep. of Germany .
674894   7/1952  United Kingdom ................ 83/520

Primary Examiner—Donald R. Schran
Assistant Examiner—Rinaldi Rada
Attorney, Agent, or Firm—Michael E. Martin

[57] ABSTRACT

A retractable dust control hood for a rotary table saw includes a generally hollow box member which is supported for movement between a working position directly over the saw blade and a retracted position substantially above the saw blade to permit ease of handling workpieces with respect to the saw and a saw support table surface. The hood is supported from a member disposed above the table surface by parallelogram linkage and a counterbalance mechanism including a rod extending between one set of parallelogram link members and a second set of parallelogram link members. A coil spring is disposed around the rod and acts to move the parallelogram link members relative to each other to counterbalance the weight of the hood. The hood includes a transparent window and a lamp for illuminating the interior space of the hood for ease of viewing the workpiece during operation of the saw. The bottom edge of the hood is provided with rub rails which minimize disfigurement of the workpiece when engaged by the hood and moving relative thereto.

9 Claims, 2 Drawing Sheets

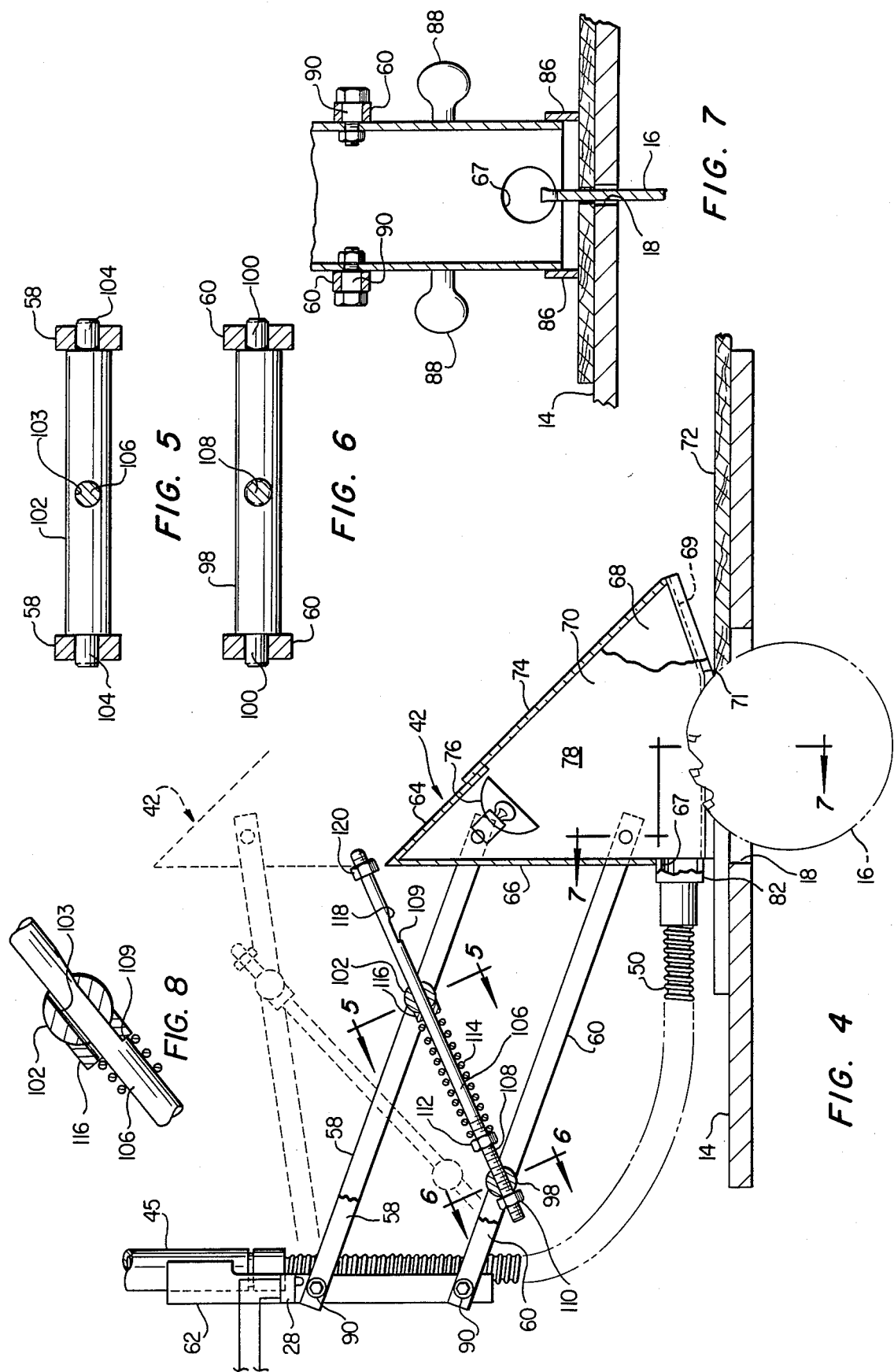

RETRACTABLE DUST CONTROL HOOD AND GUARD FOR ROTARY TABLE SAW

BACKGROUND OF THE INVENTION

1. Field of the Invention

The present invention pertains to a retractable saw dust collection and control hood and guard for use with power saws, particularly rotary table saws and the like.

1. Background

In certain types of power saws such as rotary table saws, in particular, it is desirable to continuously collect and evacuate the sawdust generated during operation from the vicinity of the saw. It is, of course, also desirable to minimize the chance of accidental engagement of the saw blade by the operator during saw operation. However, the ability to effectively operate the saw, particularly when handling large pieces of material to be cut, is compromised by heretofore known devices when placed in the vicinity of the saw blade for collecting dust or to serve as a saw guard. Accordingly, there has been a strongly felt need for an improved sawdust control hood as well as a device which will also serve to minimize the chance of accidental engagement of the saw blade by the operator. It is to this end that the present invention has been developed, which invention provides several improvements in apparatus of the general type described herein as will be appreciated by further reading the following summary, detailed description and claims.

SUMMARY OF THE INVENTION

The present invention provides an improved dust control hood for use with power saws, in particular rotary table type saws. In accordance with an important aspect of the present invention, a retractable dust control hood is provided for a rotary table saw and the like which is easily moved between a working position and a retracted position and includes mechanism for placing the hood in a selected position. In accordance with another important aspect of the invention, a retractable dust control hood is provided which is mounted on an improved support structure which provides for retracting the hood suitably away from the saw blade and the saw material support surface to permit easy handling of material in the vicinity of the saw, including relatively large panels of plywood and the like.

In accordance with still further aspects of the present invention, an improved dust control hood is provided which permits greater visibility during saw operation, due to a transparent window and a light source disposed on the hood. The hood also includes means for minimizing damage to the material being cut while remaining in close contact or direct engagement with the material to minimize the escape of dust from the interior of the hood. A motor control circuit may also be provided which is responsive to movement of the hood from a working position to a retracted position to shut-off operation of the saw drive motor.

The above-described features and advantages of the invention together with other superior aspects thereof will be further appreciated by those skilled in the art upon reading the detailed description which follows:

BRIEF DESCRIPTION OF THE DRAWING

FIG. 4 is a detail side view of the hood and its support mechanism;

FIG. 5 is a view taken generally along the line 5—5 of FIG. 4;

FIG. 6 is a view taken generally along the line 6—6 of FIG. 4;

FIG. 7 is a detail section view taken from the line 7—7 of FIG. 4; and

FIG. 8 is a detail view of the mechanism for holding the hood in a retracted position.

DESCRIPTION OF A PREFERRED EMBODIMENT

Figure 1:
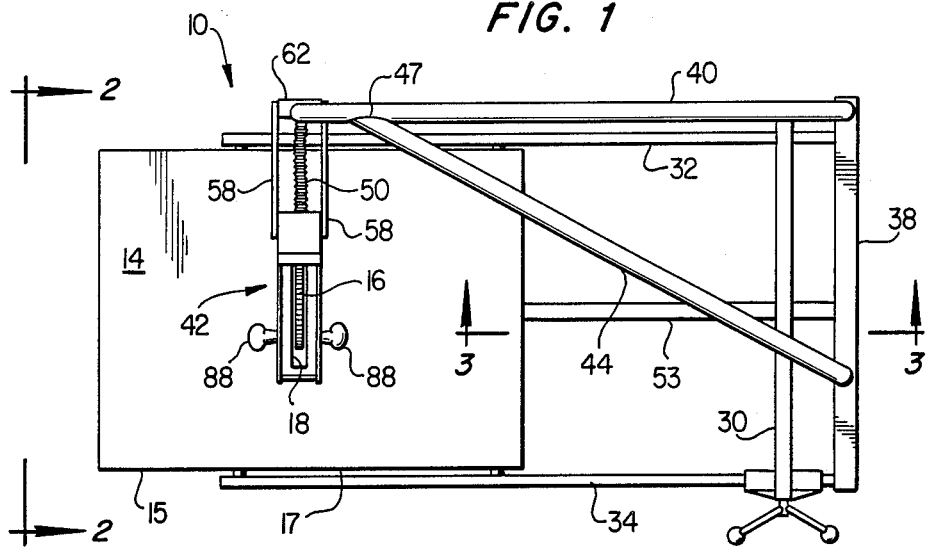
FIG. 1 is a plan view of a rotary table saw apparatus including the improved dust control hood and guard of the present invention.

In the description which follows, like parts are marked throughout the specification and drawing with the same reference numerals, respectively. The drawing figures are not necessarily to scale and certain features of the invention may be shown exaggerated in scale or in somewhat schematic form in the interest of clarity and conciseness.

Figure 2:
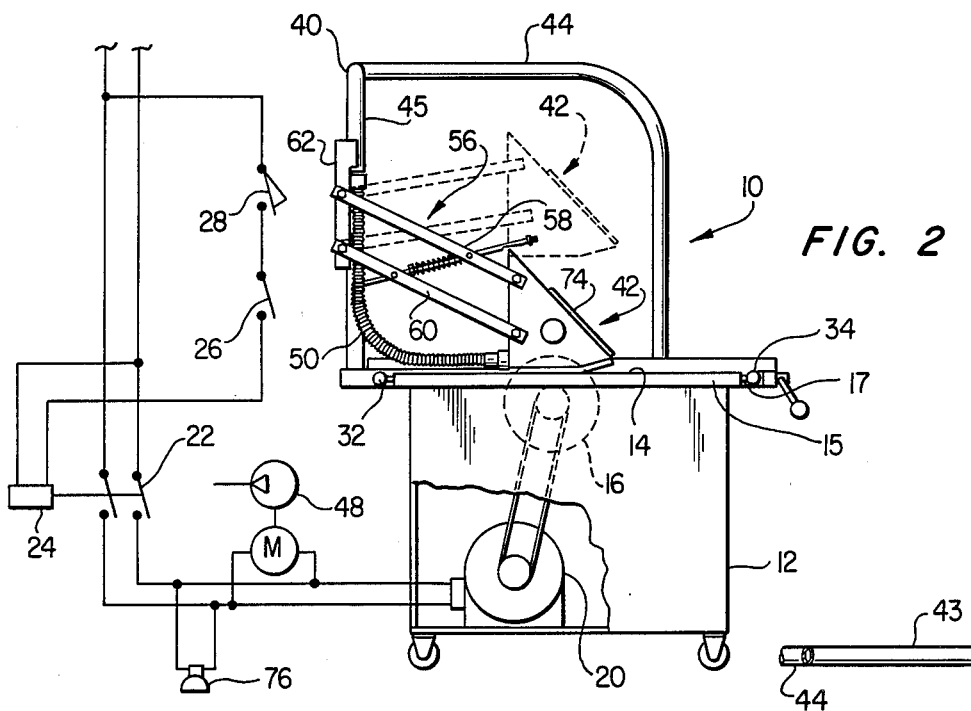
FIG. 2 is an elevation view taken generally from the line 2—2 of FIG. 1 and includes a circuit diagram.
Figure 3:
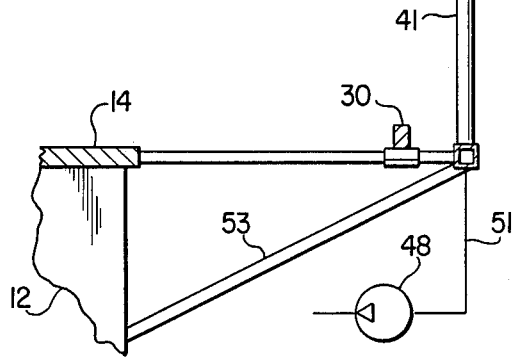
FIG. 3 is a detail view taken generally from the line 3—3 of FIG. 1.

Referring primarily to FIGS. 1, 2 and 3, the dust control hood of the present invention is illustrated in conjunction with a rotary table saw unit, generally designated by the numeral 10. The saw 10 includes a support table 12 having a material support surface 14 formed on a table member 15. A rotary saw blade 16 is supported by the table 12 for rotation with a portion of the blade projecting above the surface 14 and through a suitable slot 18 in the table member 15. The rotary saw blade 16 is suitably driven by conventional means including a motor 20. The motor 20 is controlled by a suitable electrical circuit, FIG. 2, including a starting or energizing switch 22 which is controlled by a solenoid actuator or relay mechanism 24. The actuator 24 is interposed in a circuit including an operator controlled starting and shut-down switch 26 and an automatic shut-down switch 28 which will be described in further detail herein.

The saw unit 10 includes an adjustable material locating or guide member of conventional construction and generally designated by the numeral 30. The guide member 30 is movable toward and away from the blade 16 on spaced apart support rails 32 and 34 which extend from one side of the table member 15 a distance sufficient to permit supporting relatively large panels on the surface 14 for cutting the panels to predetermined lengths. The guide rails 32 and 34 are connected to a transverse support member 38 which may comprise a channel member or a generally rectangular cross section tube. The support member 38 is adapted to support a hollow tubular support member 40 for a sawdust control hood, generally designated by the numeral 42, FIGS. 1 and 2. The support member 40 has a vertically extending portion 41 which extends from the member 38 upwardly and then is joined to a substantially horizontally extending portion 43 which extends to a depending portion 45.

A somewhat diagonally extending brace member 44 also extends from the support member 38 upwardly and horizontally to a point of connection 47, FIG. 1, with the horizontal portion 43 of the support member 40. The hollow support member 40 is suitably connected to vacuum pump means 48, as illustrated somewhat schematically in FIGS. 2 and 3, for evacuating dust from the hood 42 by way of a flexible conduit 50, FIGS. 1 and 2. The conduit 50 is connected to the support member 40 to form a continuous conduit between the interior of the hood 42 and a suitable conduit 51 leading to vacuum pump means 48 or other suitable means for evacuating the interior of the hood. A diagonal brace member 53, FIGS. 1 and 3, also extends between the support member 38 and the table 12 for steadying the supporting structure for the guide 30 and the hood 42. Thanks to the arrangement of the support members 40 and 44, substantial clearance is provided above the table surface 14 for manipulating large pieces of material to be cut by the saw 16.

Referring further to FIGS. 1 and 2, the hood 42 is supported for movement between a working position and a retracted position, shown by the phantom lines in FIG. 2, by a support mechanism, generally designated by the numeral 56. The support mechanism 56 includes parallelogram arms or link members 58 and 60 which are provided in opposed pairs and are each pivotally connected to the hood 42 and to a somewhat channel shaped support bracket 62 which is secured to and depends from the depending end 45 of the support member 40.

Referring now to FIG. 4, the hood 42 comprises a generally triangular shaped hollow box having a sloping front wall 64, a generally vertical back wall 66, opposed side walls 68 and 70 and an open bottom side facing the surface 14. The side walls 68 and 70 have respective bottom edge portions 69 and 71, see FIG. 7 also, which extend partially at an angle from the horizontal to provide limited access under the hood 42 when the hood is in a working position so that a measuring tape or other measuring device may be located with respect to the saw blade 16 and the material being cut, such as a plank 72, shown in FIGS. 4 and 7. A major portion of the front wall of the hood 42 is characterized by a transparent window 74 formed of a suitable transparent material such as acrylic plastic or shatter resistant glass. An electric lamp 76 is disposed in the interior space 78 of the hood 42 to illuminate the work area generally under the interior of the hood when the hood is in a working position.

The back wall 66 includes an opening 67 near the bottom edge thereof which receives a tubular fitting 82 suitably connected to the flexible conduit 50 for providing a flow path to evacuate sawdust and other debris from the space 78 during operation of the saw with the hood 42 in a working position. The hood 42 is also provided with relatively soft plastic wear strips or rub rails 86 which extend along the bottom edges of the side walls 68 and 70, respectively, for engaging the material being cut by the saw blade 16 to minimize disfigurement of the material. As shown in FIG. 7, the hood 42 may be advantageously provided with opposed handles 88 mounted on each of the side walls 68 and 70.

Referring further to FIGS. 4 and 7, the members 58 and 60 are each pivotally secured to the side walls 68 and 70 by suitable connection means including pivot pins 90. The members 58 and 60 are also each secured to the support bracket 62 by additional pivot pins 90, as shown by example in FIG. 4. Referring to FIGS. 5 and 6 also, the support mechanism 56 further includes a counterbalance mechanism characterized by a shaft 98 extending between the members 60 and having opposed trunnion portions 100 which are journalled in suitable bores formed in the members 60. A shaft 102 extends between the members 58 and also has suitable opposed trunnion portions 104 which are journalled in cooperating bores formed in the members 58. An elongated rod 106 extends through and is slidably disposed in a bore 103 formed in the shaft 102. The rod 106 includes a threaded portion 108 which is threadedly engaged with and extends through the shaft 98. The position of the rod 106 relative to the shaft 98 may be adjusted and the rod secured in a selected position by a lock nut 110. A nut 112, FIG. 4, is also disposed on the rod threaded portion 108 and is engageable with one end of a coil compression spring 114 which extends between the nut 112 and a bushing 116 slidably disposed on the rod 106 and interposed between the shaft 102 and the spring. The spring 114 may be adjustably compressed by the nut 112 to exert a force on the shaft 102 and the link members 58 to urge the link members 58 to move away from the link members 60, due to the spacing of the shafts 98 and 102, in such a way that a reaction force tends to pivot the members 58 in a counterclockwise direction, viewing FIG. 4, about the pivot connections of the members 58 with the bracket 62. In this way, the weight of the hood 42 is counteracted by the extension force of the spring 114 so that the effective weight of the hood may be very slight in its selected working position and the hood may be easily moved from a working position to a retracted position by the saw operator.

The rod 106 also includes a transverse edge portion 109 formed by a relieved or recessed surface 118 and in such a way that when the rod is extended through the bore 103 to a point where the edge 109 may engage the bushing 116, the hood 42 may be secured in a fully retracted position as illustrated in FIGS. 2, 4 and 8. A retaining nut 120 is secured to the end of the rod 106 opposite the threaded portion 108 to limit the movement of the rod 106 through the bore 103 when moving the hood 42 to a fully retracted position. When the hood 42 is lifted away from its working position, one of the members 58 is engageable with the switch 28, which is suitably mounted on the bracket 62, to move the switch to an open position to prevent operation of the saw drive motor 20.

In the operation of the sawdust control hood 42, the saw operator would normally stand at the side edge 17, FIG. 1, of the table 15 facing the hood 42 and the saw blade 16. If the hood 42 is in the retracted position and locked by engagement of the rod support edge 109 with the bushing 116, the rod would be moved laterally sufficiently to permit clearing the support edge 109 from the bushing and movement of the rod further into the bore 103 to effectively allow lowering of the hood 42 into a working position. By suitable adjustment of the position of the nut 112, the spring 114 is compressed such that very little downward force is acting on the hood 42 to engage the workpiece 72. Preferably, the hood 42 is in light contact with the workpiece by the rub rails 86, but not such as to interfere with operation of the saw or movement of the workpiece during sawing operations. When the motor 20 is energized to rotate the saw blade 16, the vacuum pump 48 is also energized simultaneously to draw air through the conduit 50 to evacuate dust from the space 78. The upward sloped edge portions 69 and 71 also provide clearance for entry of air into the space 78. The lamp 76 may also be suitably connected in circuit with the motor 20 and vacuum pump 48, as shown in FIG. 2, to illuminate the space 78 during operation of the saw. The counterbalance spring 114 may be suitably adjusted so that a relatively wide range of movement of the hood 42 from a position directly adjacent the surface 14 to a position above the surface, corresponding to the maximum material thickness that could be cut by the saw blade 16, can be achieved without the weight of the hood interfering with the movement of the material through the saw blade and across the surface 14. The configuration of the support member 40, the bracket 62 and the support structure including the parallelogram link members 58 and 60 for the hood 42 provides a substantially unencumbered work area on the table surface 14 which does not interfere with handling and positioning of material to be cut by the saw blade 16.

The apparatus described herein may be constructed using conventional engineering materials and may be adapted to be used with rotary table saws of various configurations as well as similar dust generating power tools. Although a preferred embodiment of the invention has been described in detail, those skilled in the art will recognize that various substitutions and modifications may be made to the invention set forth in the appended claims without departing from the scope and spirit thereof.

What we claim is:

1. A dust collection and control apparatus for a dust generating power tool such as a rotary table saw and the like having a workpiece support surface for supporting work material during a sawing operation, said apparatus comprising:

a dust control hood defining an interior space and an open side for movement into proximity of a piece of work material for containing and evacuating dust generated during a cutting operation on said material;

support means for said hood including a vertically extending support member secured in a fixed position relative to a work surface of said tool;

link means interconnecting said hood and said support member for moving said hood between a working position adjacent said support surface and a retracted position substantially clear of said support surface to permit placement of material on and removal of material from said support surface, said link means including vertically spaced apart first and second pairs of parallelogram link members interconnecting said hood with said support member and operable for moving said hood to selected working positions with respect to said support surface to accommodate various thicknesses of material to be cut by said tool;

counterbalance means including a rod connected to a means disposed between and connected to said link members of said first pair extending to a means disposed between and connected to said link members of said second pair; and spring means associated with said rod and engaged with said means connected to said second pair of link members for urging said link members to pivot said hood toward a retracted position.

2. The apparatus set forth in claim 1 including:
    means for adjusting said spring means to selectively control the counterbalance force acting to urge said hood toward a retracted position.

3. The apparatus set forth in claim 1 including:
    means for securing said hood in a retracted position.

4. The apparatus set forth in claim 1 including:
    motor means for operating said tool, said motor means including an electrical control circuit and switch means interposed in said control circuit and operable by said link means to prevent operation of said motor when said hood is in a retracted position.

5. The apparatus set forth in claim 1 including:
    flexible conduit means interconnecting said hood and said support member for conducting dust from an interior space of said hood through said flexible conduit means.

6. The apparatus set forth in claim 5 wherein:
    said support member includes passage means formed therein and said flexible conduit means is connected to said passage means formed in said support member for conducting dust from said interior space through said passage means.

7. The apparatus set forth in claim 1 wherein:
    said hood comprises a generally triangular shaped box having a sloping front wall, a portion of said front wall being formed of a transparent material to provide for viewing the operation of said tool to cut said material when said hood is in a working position.

8. The apparatus set forth in claim 7 including:
    lamp means disposed in said interior space for illuminating said interior space when said hood is in said working position.

9. A dust control hood apparatus for a rotary table saw and the like, said table saw including a generally flat table support surface and a cutting blade extending from said support surface for engagement with a workpiece to be cut and supported on said support surface, said hood apparatus including:

a generally tubular support member disposed spaced from said support surface;

a dust control hood characterized by a generally box-like member having an open side facing said support surface and opposed walls defining an interior space for collecting and evacuating dust from the vicinity of said cutting blade;

flexible conduit means connected to said hood and to said support member for withdrawing air from said interior space with dust entrained therein for evacuating dust generated by said cutting blade during the operation of said cutting blade; and hood support means interconnected said hood and said support member comprising spaced apart pairs of parallelogram link members pivotally connected to said support member and to said hood at opposite ends of said link members, respectively, shaft means disposed between and connected to said link members of each pair, respectively, and said shaft means being spaced apart, elongated rod means extending between and connected to one of said shaft means and slidably supported by the other of said shaft means, and adjustable spring means disposed along said rod means and between said shaft means for urging said support means to counteract the weight of said hood when said hood is in a working position.

* * * * *